Patented Dec. 11, 1934

1,984,173

UNITED STATES PATENT OFFICE 1,984,173

COMPOSITION OF MATTER, ETC.

Charles H. Champion, New York, N. Y., assignor to R. T. Vanderbilt Co., Inc., New York, N. Y., a corporation of New York No Drawing. Application May 13, 1931, Serial No. 537,205. Renewed October 25, 1934

2 Claims. (Cl. 134—18)

This invention relates to a new composition of matter and to improved methods of using the same for coating, filling, and other purposes.

The new composition is a dry mixture containing alum, lime, and calcium carbonate, with the calcium carbonate predominating in amount in most cases, and with the lime and alum in varying proportions. The composition is prepared by mixing the materials dry to obtain an intimate and uniform admixture.

When the dry composition is added to water, the lime and alum will react in the presence of the calcium carbonate to form a reaction mixture or composition containing the calcium carbonate distributed in and suspended in the reaction products of the lime and alum. The reaction mixture thus produced is a valuable material as a filling material for paper or textiles or for coating paper or textiles, etc. and for various other purposes such as a cold water paint composition. After drying, the reaction mixture is a valuable material for compounding with rubber or in making oil paints, etc.

Calcium carbonate is extensively used as a filling material, for example, for filling and coating paper, but it does not readily stay in suspension and readily settles out when an opportunity is given for it to do so. It is also known that lime and alum will react together, in certain proportions, to give a reaction product which can be used for certain purposes, such as the coating of paper. To some extent also, calcium carbonate has been used in admixture with such previously prepared reaction products of alum and lime in the coating of paper.

I have found that improved results in the coating of paper, and also in the filling of paper, can be obtained by admixing the lime and alum dry with calcium carbonate, in proper proportions, and adding the resulting dry mixture to water so that the reaction between the lime and alum takes place in the presence of the calcium carbonate to form a reaction product in which the calcium carbonate is suspended in and surrounded by the reaction product. The admixture of the dry ingredients, and the addition of the dry mixture to water, makes unnecessary the separate preliminary reaction of lime with alum and the drying of the reaction product before shipment and use, and gives a reaction product in which the calcium carbonate is suspended in and surrounded by the reaction product in a manner not obtainable where the reaction product is first prepared and dried and subsequently admixed with the calcium carbonate.

The proportions of calcium carbonate, lime and alum used in making the new composition can be varied. In general the calcium carbonate will be present in preponderating amount, and for certain purposes, such as used in filling paper, the calcium carbonate forms from about 75 to 90% by weight of the dry mixture. The proportions of alum and lime to each other can also be varied, for example, from about equal proportions to an amount of alum which is as much as about four or five times the weight of the lime.

The proportions of alum and lime can be varied over a much wider range, in the new dry mixture of the present invention, than is possible with mixtures of lime and alum when these two materials are caused to react with each other in the absence of calcium carbonate, and where the proportions approximate equal proportions of alum and lime. I have found that the alum can be increased to as much as four or five times the weight of the lime when calcium carbonate is admixed therewith, and that the resulting dry mixture is a valuable composition for use in paper mills as a filling for paper. Such a dry mixture, when added to water, will undergo reaction to form a suspension of the calcium carbonate in the reaction products of the lime and alum, which suspension and reaction products are valuable filling materials for the filling of paper. An advantageous proportion of ingredients for this purpose is about 84% by weight of calcium carbonate, about 12% of alum and about 4% of lime (hydrated).

The calcium carbonate employed is precipitated calcium carbonate such as is obtainable by the carbonating of milk of lime or as a by-product from the causticizing of sodium carbonate solution with milk of lime. For most purposes it should be free from gritty admixtures which can be readily separated from the milk of lime before carbonating or before using it for causticizing. The precipitated calcium carbonate will be dried and reduced to a finely divided state, so that, for example, the greater part of it will pass through a 200 mesh screen, although the fineness of the calcium carbonate can be varied somewhat depending upon the purpose for which the composition is to be used, and a more finely divided product can be used when desired.

The lime employed in the new composition is hydrated lime freed from objectionable admixtures of gritty or foreign materials and in a suitably dried and finely divided state so that it can be admixed with the calcium carbonate and alum to form a uniform admixture. The alum used is the ordinary alum of commerce in a finely divided state.

In the filling of paper it is customary to add clay to the beater so that it will be incorporated in the paper when the pulp, after beating and subsequent dilution, is formed into a sheet of paper on the paper machine; but substantial losses of clay as well as of other constituents including pulp fibers frequently occur in the white water or waste water from the paper making operation. The new dry composition, when added to the beater, or when first added to water and caused to react and the resulting reaction mixture is added to the beater, forms a valuable substitute for clay as a filler and appears to have a coagulating effect on the water in which the pulp is suspended so that losses in the white water or waste water are minimized. When used for filling paper the calcium carbonate will in general form from around 75 to 90% of the dry mixture and the lime and alum together from about 25 to 10% of the mixture. The proportions of alum to lime can vary, for example, from around equal proportions up to around one and a half times as much alum as lime and even up to as much as four or five times as much alum as lime; and the higher proportions of alum to lime are particularly advantageous in paper mill operations where the dry mixture is added to the furnish or first caused to react with water and then added to the beater.

Instead of using a high proportion of alum to lime in the dry mixture, a lower proportion can be used, particularly where alum is separately added to the pulp in the paper mill. The alum previously added and present in the water will react with the added ingredients of the dry mix or with the reaction product of the dry mix when it is added to water and caused to react before adding it to pulp.

The reaction products resulting from the reaction of alum and lime in the presence of water are more or less colloidal in character and the reaction products are more or less gelatinous and voluminous. When the reaction takes place in the presence of calcium carbonate uniformly distributed throughout the mixture, the calcium carbonate is suspended in the reaction products, but the presence of the calcium carbonate results in an apparent tendency toward agglomeration of the reaction products. For example, when the dry reaction mixture containing calcium carbonate is caused to react in water and the reaction product is permitted to settle, the volume is considerably less than the volume of the reaction product between alum and lime alone after being permitted to settle; but the volume is far greater than that of the calcium carbonate by itself. When the reaction product is formed in the paper pulp, by adding the dry mixture to the paper pulp, or when the reaction is caused to take place in the presence of a limited amount of water and the resulting reaction mixture containing the reaction product in suspension in water is added to the pulp, the individual particles of calcium carbonate suspended in the reaction products of the lime and alum are readily incorporated with the fibers when the pulp, after beating, is diluted with water and forms into paper on the paper machine.

For the coating of paper, the same proportions of the ingredients of the dry mixture may be employed as for filling paper, and such a mixture forms a valuable substitute for clay fillers. Where a lighter colored material is desired, less calcium carbonate can be used and an increased proportion of the alum and lime. So also, the proportions of alum and lime, for making a coating material, may approximate more closely to equal proportions, without using such a large excess of alum as is desirable for filling material. By varying the proportions of lime and alum, the gloss desired on the finished coated paper can be varied; for example, using equal parts of lime and alum will produce a high gloss sheet, whereas using three parts of alum to one of lime will produce a low gloss sheet. In applying the new composition for coating paper, the dry mixture is added to water and the reaction is permitted to take place and the resulting suspension is then added to a solution or suspension of other ingredients, such as a solution of casein or glue in alkali. In general the reaction products produced from the dry mixture, on reaction in water, can be used much as clay is used in coating paper; but where smaller proportions of calcium carbonate are present in the dry mixture, the dry mixture can be used to replace not only part of the clay or all of the clay, but also part or all of the previously prepared reaction products of alum and lime by themselves, which reaction products are now employed in a previously prepared form for certain grades of coated paper.

The amounts of the new composition used for filling or coating paper can be varied, depending upon the results desired. Even where high percentages of filler are desired, the new composition enables such percentages to be obtained without excessive loss in the waste water. When it is considered that for each thousand pounds of pulp (dry weight) in a beater there are around twenty-four thousand pounds of water, and that this stock is later diluted, after beating, with around eight to ten parts of water for each part of stock, it will be appreciated that there is a large volume of water to be separated from the pulp during the paper making operation, and that the loss of even small percentages of clay or other filler in the waste water involves an important loss in the aggregate. The reaction product resulting from the use of the dry mixture of the present invention, because of its colloidal or gelatinous character, and because the calcium carbonate is suspended in such colloidal or gelatinous reaction product, is of such a character that not only are losses of the filling material itself minimized, but losses of the pulp itself are minimized.

The new dry composition, after reacting in water, can be used for the coating or filling of other materials than paper, for example, for filling textile materials or fabrics of various kinds. The reaction product can be dried and the dried product ground and used as a pigment or filler for various purposes such as rubber, oil paints, etc. The reaction product itself, without drying, and properly diluted with water, and with other admixtures if desired, can be used directly as a cold water paint or for other purposes.

It will thus be seen that the present invention provides a dry composition which can be readily manufactured and shipped and stored and which is adapted for use either in a dry state by adding to paper pulp or by first adding it to water and permitting the reaction to take place after which the reaction mixture can be added to the paper pulp, or used for other purposes, such as those above referred to. The new composition thus referred to facilitates the filling of paper, requiring merely that the proper amount of dry mixture be added to the paper pulp or first added to water and the reaction mixture then added to the pulp. It will also be seen that the composition provides not only an improved substitute for clay fillers, but a filling composition which has distinct advantages. Whereas calcium carbonate alone, when used as a filler, gives a harsh paper, the use of the new composition overcomes the harshness and gives a soft filled paper.

While I have described the new composition as being made up of calcium carbonate, alum and lime, I do not exclude the presence of other constituents which do not interfere with the desired reaction and suspension of the calcium carbonate in the reaction product, or which supplement and modify these ingredients.

I claim:

1. A new composition consisting of a dry mixture of calcium carbonate, alum and lime, all in a finely divided state, the calcium carbonate being present in preponderating amount, the amount of alum being insufficient to react with all of the calcium carbonate and the proportion of alum to lime varying from about equal proportions to about five times as much alum as lime or more, said dry composition being adapted to be shipped and stored and used in predetermined amounts with water, with resulting reaction of the alum and lime in the presence of the calcium carbonate to form a reaction mixture containing the calcium carbonate in suspension in the reaction products of the alum and lime.

2. A new composition consisting of a dry mixture of calcium carbonate, alum and lime, all in a finely divided state, the calcium carbonate forming about 75 to 90% by weight of the dry mixture, the amount of alum being insufficient to react with all of the calcium carbonate and the ratio of alum to lime varying from about 1 to 1 up to about 5 to 1, said dry composition being adapted to be shipped and stored in a dry state and used by addition of water with resulting reaction of the alum and lime in the presence of the calcium carbonate to form a reaction mixture containing the calcium carbonate in suspension in the reaction products of the alum and lime.

CHARLES H. CHAMPION.